United States Patent
Tetsui et al.

(10) Patent No.: US 11,098,152 B2
(45) Date of Patent: Aug. 24, 2021

(54) ONE-PACK TYPE AQUEOUS RESIN COMPOSITION AND FIBER LAMINATE

(71) Applicant: DIC Corporation, Tokyo (JP)

(72) Inventors: Tomohiro Tetsui, Osaka (JP); Hiroyuki Chijiwa, Osaka (JP)

(73) Assignee: DIC CORPORATION, Tokyo (JP)

( * ) Notice: Subject to any disclaimer, the term of this patent is extended or adjusted under 35 U.S.C. 154(b) by 337 days.

(21) Appl. No.: 16/090,085

(22) PCT Filed: Feb. 16, 2017

(86) PCT No.: PCT/JP2017/005659
§ 371 (c)(1),
(2) Date: Sep. 28, 2018

(87) PCT Pub. No.: WO2017/169244
PCT Pub. Date: Oct. 5, 2017

(65) Prior Publication Data
US 2020/0332048 A1 Oct. 22, 2020

(30) Foreign Application Priority Data

Apr. 1, 2016 (JP) .............................. JP2016-074286

(51) Int. Cl.
| | | |
|---|---|---|
| *C08G 18/08* | (2006.01) | |
| *B32B 27/12* | (2006.01) | |
| *C08G 18/32* | (2006.01) | |
| *C08G 18/44* | (2006.01) | |
| *C08G 18/66* | (2006.01) | |
| *C08G 18/76* | (2006.01) | |
| *B32B 27/40* | (2006.01) | |
| *C08G 18/34* | (2006.01) | |
| *C08G 18/42* | (2006.01) | |
| *C08G 18/48* | (2006.01) | |

(52) U.S. Cl.
CPC .......... *C08G 18/0823* (2013.01); *B32B 27/12* (2013.01); *B32B 27/40* (2013.01); *C08G 18/3206* (2013.01); *C08G 18/34* (2013.01); *C08G 18/4277* (2013.01); *C08G 18/44* (2013.01); *C08G 18/4854* (2013.01); *C08G 18/664* (2013.01); *C08G 18/6674* (2013.01); *C08G 18/7671* (2013.01)

(58) Field of Classification Search
None
See application file for complete search history.

(56) References Cited

FOREIGN PATENT DOCUMENTS

| | | | |
|---|---|---|---|
| JP | H09-302220 A | | 11/1997 |
| JP | 10-195412 A | | 7/1998 |
| JP | 2002012812 A | * | 1/2002 |
| JP | 2003-119677 A | | 4/2003 |
| JP | 2003-336028 A | | 11/2003 |
| JP | 3786553 B2 | | 6/2006 |
| WO | 2009/051104 A1 | | 4/2009 |

OTHER PUBLICATIONS

Derwent 2002-263179, Aqueous coating materials for gloves, canvas, flags, containing olefin group resin aqueous polyurethane material, Okada et al, p. 1-5. 2002 (Year: 2002).*
International Search Report issued in corresponding International Patent Application No. PCT/JP2017/005659, dated May 23, 2017, with English Translation.
Notification of Reason for Refusal issued in Korean Application No. 10-2018-7026138, dated Oct. 7, 2019, with English language translation.

\* cited by examiner

*Primary Examiner* — Jeffrey D Washville
(74) *Attorney, Agent, or Firm* — McDermott Will & Emery LLP

(57) ABSTRACT

The present invention provides a one-component aqueous resin composition including: an aqueous urethane resin (A), an aqueous urethane resin (A) that has a flow starting temperature of 50° C. to 155° C. and an acid value of 15 mgKOH/g or lower; and an aqueous medium (B). In addition, the present invention provides a fiber laminate including: a layer (iii) that is made from the one-component aqueous resin composition; and a fiber base (iv). The aqueous urethane resin (A) is preferably a specific anionic urethane resin (A-A-1) or an anionic urethane resin (A-A-2). The one-component aqueous resin composition of the present invention exhibits excellent adhesiveness and resistance to moist heat without the aid of a crosslinking agent.

1 Claim, No Drawings

ONE-PACK TYPE AQUEOUS RESIN COMPOSITION AND FIBER LAMINATE

CROSS REFERENCE TO RELATED APPLICATIONS

This application is the U.S. National Phase under 35 U.S.C. § 371 of International Application No. PCT/W2017/005659, filed on Feb. 16, 2017, which claims the benefit of Japanese Application No. 2016-074286, filed on Apr. 1, 2016, the entire contents of each are hereby incorporated by reference.

TECHNICAL FIELD

The present invention relates to a one-component aqueous resin composition produced with no crosslinking agent and to a fiber laminate obtained using the same.

BACKGROUND ART

Aqueous urethane resin compositions containing a urethane resin dispersed in an aqueous medium can reduce the burden on the environment as compared with organic solvent-based urethane resin compositions in the related art. In recent years, therefore, aqueous urethane resin compositions start to be advantageously used as materials for manufacturing leather-like sheets such as artificial leather and synthetic leather, gloves, coating agents for curtains, sheets and the like, adhesives, and the like.

Such aqueous urethane resin compositions are generally used in the form of a two-component system, which includes a main component including an aqueous urethane resin and a crosslinking agent such as a carbodiimide compound to be blended therewith, in order to impart excellent peel strength and durability (for example, refer to PTL 1). However, in the case of such a two-component system, the pot life of the blended liquid (the time during which the blended liquid is usable) is short and aging is also necessary, which raises a very serious problem with manufacturing process management and energy costs. On the other hand, a one-component system containing no crosslinking agent has a long-term problem with improvements in adhesive properties such as peel strength and in durability such as moist heat resistance.

CITATION LIST

Patent Literature

PTL 1: JP-A-10-195412

SUMMARY OF INVENTION

Technical Problem

An object to be solved by the present invention is to provide a one-component aqueous resin composition which exhibits excellent adhesiveness and resistance to moist heat without the aid of a crosslinking agent.

Solution to Problem

The present invention provides a one-component aqueous resin composition including: an aqueous urethane resin (A) that has a flow starting temperature of 50° C. to 155° C. and an acid value of 15 mgKOH/g or lower; and an aqueous medium (B).

In addition, the present invention provides a fiber laminate including: a layer (iii) that is made from the one-component aqueous resin composition; and a fiber base (iv).

Advantageous Effects of Invention

The one-component aqueous resin composition of the present invention exhibits excellent adhesiveness and resistance to moist heat without the aid of a crosslinking agent. Further, no use of a crosslinking agent can eliminate the need to consider pot life or aging. Accordingly, the one-component aqueous resin composition of the present invention is suitable for use in manufacturing gloves, leather-like sheets, curtains, sheets, and the like.

DESCRIPTION OF EMBODIMENTS

The one-component aqueous resin composition of the present invention includes an aqueous urethane resin (A) that has a flow starting temperature of 50° C. to 155° C. and an acid value of 15 mgKOH/g or lower, and an aqueous medium (B).

The aqueous urethane resin (A) with a flow starting temperature and an acid value designed within the specific range can have excellent adhesiveness and resistance to moist heat without the aid of a crosslinking agent. The reason for this is that by designing the flow starting temperature within the specific range, the aqueous urethane resin (A) is melted in a thermocompression bonding step and penetrates into the fiber base (iv), thereby obtaining excellent adhesiveness. Also, after the thermocompression bonding step, the aqueous urethane resin (A) is crystallized and solidified in a normal operating temperature range below the flow starting temperature, so that it exhibits strong adhesive strength. Further, it is considered that by designing the acid value within the specific range, hydrolysis of the layer (iii) that is formed from the one-component aqueous resin composition is suppressed, so that excellent adhesiveness and resistance to moist heat can be obtained. The flow starting temperature of the aqueous urethane resin (A) is preferably 80° C. to 140° C., and more preferably 90° C. to 130° C., from the viewpoint of obtaining even better adhesiveness and resistance to moist heat. As the acid value of the aqueous urethane resin (A) is preferably 0 to 10 mgKOH/g, and is more preferably 0 to 7 mgKOH/g, for the same reason.

A method of adjusting the flow starting temperature of the aqueous urethane resin (A) may be a method of adjusting the flow starting temperature by selecting the type of a polyol (a1) which is a raw material for the aqueous urethane resin (A) described later, the amount of a chain extender (a2), and the type of polyisocyanate (a3). The method of adjusting the flow starting temperature to a high level may be a method of using a polyol having high crystallinity such as polycarbonate polyol as the polyol (a1), a method of increasing the amount of the chain extender (a2) used, or a method of using a polyisocyanate having high crystallinity such as 4,4'-diphenylmethane diisocyanate or dicyclohexylmethane diisocyanate as a polyisocyanate (a3). On the other hand, the method of adjusting the flow starting temperature to a low level may be a method of using a polyol having low crystallinity such as polyoxypropylene glycol as the polyol (a1), a method of decreasing the amount of the chain extender (a2) used, or a method of using a polyisocyanate having low crystallinity such as toluene diisocyanate or isophorone diisocyanate as a polyisocyanate (a3). Therefore, by appropriately selecting these methods, the flow starting temperature of the aqueous urethane resin (A) can be adjusted. The method of measuring the flow starting temperature of the aqueous urethane resin (A) will be described in examples below.

The method of adjusting the acid value of the aqueous urethane resin (A) may be a method of using a nonionic urethane resin with no acid value or a method of adjusting the amount of raw materials used for producing the aqueous urethane resin mainly having an anionic group described later in a case where an anionic urethane resin is used. In this regard, the method of measuring the acid value of the aqueous urethane resin (A) will be described in examples below.

The aqueous urethane resin (A) can be dispersed in an aqueous medium (B) to be described later and examples thereof include an aqueous urethane resin having a hydrophilic group such as an anionic group, a cationic group, and a nonionic group; an aqueous urethane resin which is forcibly dispersed in the aqueous medium (B) with an emulsifier. These aqueous urethane resins (A) may be used alone, or two or more types thereof may be used in combination. Among them, from the viewpoint of production stability, it is preferable to use an aqueous urethane resin having a hydrophilic group, and from the viewpoint of obtaining even better adhesiveness and resistance to moist heat, an aqueous urethane resin having an anionic group, and/or a nonionic urethane resin is more preferably used.

As a method of obtaining the aqueous urethane resin having an anionic group, for example, a method of using one or more compounds selected from the group consisting of a glycol compound having a carboxyl group and a compound having a sulfonyl group as a raw material can be exemplified.

Examples of the glycol compound having a carboxyl group include 2,2-dimethylolpropionic acid, 2,2-dimethylolbutanoic acid, 2,2-dimethylolbutyric acid, 2,2-dimethylolpropionic acid, and 2,2-valeric acid. These compounds may be used alone, or two or more types thereof may be used in combination.

Examples of the compound having the sulfonyl group include 3,4-diaminobutane sulfonic acid, 3,6-diamino-2-toluene sulfonic acid, 2,6-diaminobenzene sulfonic acid, and N-(2-aminoethyl)-2-aminoethyl sulfonic acid. These compounds may be used alone, or two or more types thereof may be used in combination.

From the viewpoint of easily adjusting the acid value of the aqueous urethane resin (A), and obtaining further excellent adhesiveness and resistance to moist heat, the amount of the raw material used for producing the aqueous urethane resin having an anionic group is preferably 0.1% to 4.8% by mass, more preferably 0.5% to 4% by mass, and still more preferably 1% to 3% by mass, with respect to the total mass of the polyol (a1), a raw material used for producing the aqueous urethane resin having an anionic group, and a chain extender (a2).

The carboxyl group and the sulfonyl group may be partially or entirely neutralized with a basic compound in the one-component aqueous resin composition. Examples of the basic compound include organic amine such as ammonia, triethylamine, pyridine, and morpholine; alkanolamine such as monoethanolamine and dimethylethanolamine; a metal base compound such as sodium, potassium, lithium, and calcium.

As a method of obtaining the aqueous urethane resin having a cationic group, for example, a method of using one or more compounds having an amino group as a raw material can be exemplified.

Examples of the compound having the amino group include a compound having primary and secondary amino groups such as triethylenetetramine and diethylenetriamine; and a compound having a tertiary amino group such as N-alkyl dialkanolamine such as N-methyl diethanolamine and N-ethyl diethanolamine, and N-alkyl diaminoalkyl amine such as N-methyl diaminoethylamine, N-ethyl diaminoethylamine. These compounds may be used alone, or two or more types thereof may be used in combination.

As a method of obtaining the aqueous urethane resin having a nonionic group, for example, a method of using one or more compounds having an oxyethylene structure as a raw material can be exemplified.

As the compound having an oxyethylene structure, for example, a polyether polyol having the oxyethylene structure such as polyoxyethylene glycol, polyoxyethylene polyoxypropylene glycol, and polyoxyethylene polyoxytetramethylene glycol can be used. These compounds may be used alone, or two or more types thereof may be used in combination.

In a case where the compound having an oxyethylene structure is used, the amount thereof is preferably 1% to 20% by mass, more preferably 2.5% to 17.5% by mass, and still more preferably 5 to 15% by mass, with respect to the total mass of the polyol (a1), the compound having an oxyethylene structure, and the chain extender (a2).

Examples of the emulsifier which can be used for obtaining the aqueous urethane resin which is forcibly dispersed in the aqueous medium (B) include a nonionic emulsifier such as polyoxyethylene nonylphenyl ether, polyoxyethylene lauryl ether, polyoxyethylene styryl phenyl ether, polyoxyethylene sorbitol tetraoleate, polyoxyethylene•polyoxypropylene copolymer; an anionic emulsifier such as fatty acid salts such as sodium oleate, alkyl sulfate ester salt, alkyl benzene sulfonate, alkyl sulfosuccinate, naphthalene sulfonate, polyoxyethylene alkyl sulfate, alkanesulfonate sodium salt, alkyl diphenyl ether sulfonic acid sodium salt; and a cationic emulsifier such as alkylamine salt, alkyl trimethyl ammonium salt, and alkyl dimethyl benzyl ammonium salt. These emulsifiers may be used alone, or two or more types thereof may be used in combination.

Specifically, the aqueous urethane resin (A) to be used may be a reaction product of the polyol (a1), a raw material for producing an aqueous urethane resin having a hydrophilic group, a chain extender (a2), and a polyisocyanate (a3).

Examples of the polyol (a1) include polyether polyol, polyester polyol, polyacryl polyol, polycarbonate polyol, and polybutadiene polyol. These polyols may be used alone, or two or more types thereof may be used in combination. Note that, in a case where a nonionic urethane resin is adopted as the aqueous urethane resin (A), as the polyol (a1), those other than the compound having the oxyethylene structure are adopted.

The number average molecular weight of the polyol (a1) is preferably 500 to 8,000, and more preferably 800 to 4,000, from the viewpoint of the mechanical strength of the resulting film. Note that, the number average molecular weight of the polyol (a1) is a value obtained by measuring by a gel permeation column chromatography (GPC) method under the following conditions.

Measuring device: High speed GPC device ("HLC-8220GPC" manufactured by TOSOH CORPORATION)

Column: the following columns manufactured by TOSOH CORPORATION were used by being connected in series.

"TSKgel G5000" (7.8 mmI.D.×30 cm)×one
"TSKgel G4000" (7.8 mmI.D.×30 cm)×one
"TSKgel G3000" (7.8 mmI.D.×30 cm)×one
"TSKgel G2000" (7.8 mmI.D.×30 cm)×one
Detector: RI (differential refractometer)
Column temperature: 40° C.
Eluent: tetrahydrofuran (THF)
Flow rate: 1.0 mL/min
Injection volume: 100 μL (tetrahydrofuran solution having a sample concentration of 0.4% by mass)
Standard sample: a calibration curve was prepared using the following standard polystyrene.

Standard Polystyrene

"TSKgel standard polystyrene A-500" manufactured by TOSOH CORPORATION
"TSKgel standard polystyrene A-1000" manufactured by TOSOH CORPORATION
"TSKgel standard polystyrene A-2500" manufactured by TOSOH CORPORATION
"TSKgel standard polystyrene A-5000" manufactured by TOSOH CORPORATION
"TSKgel standard polystyrene F-1" manufactured by TOSOH CORPORATION
"TSKgel standard polystyrene F-2" manufactured by TOSOH CORPORATION
"TSKgel standard polystyrene F-4" manufactured by TOSOH CORPORATION
"TSKgel standard polystyrene F-10" manufactured by TOSOH CORPORATION
"TSKgel standard polystyrene F-20" manufactured by TOSOH CORPORATION
"TSKgel standard polystyrene F-40" manufactured by TOSOH CORPORATION
"TSKgel standard polystyrene F-80" manufactured by TOSOH CORPORATION
"TSKgel standard polystyrene F-128" manufactured by TOSOH CORPORATION
"TSKgel standard polystyrene F-288" manufactured by TOSOH CORPORATION
"TSKgel standard polystyrene F-550" manufactured by TOSOH CORPORATION As the chain extender (a2), ones having the number average molecular weight of 50 to 450 can be used, and examples thereof include a chain extender (a2-1) having a hydroxyl group, such as an ethylene glycol, diethylene glycol, triethylene glycol, propylene glycol, dipropylene glycol, 1,3-propanediol, 1,3-butanediol, 1,4-butanediol, hexamethylene glycol, sucrose, methylene glycol, glycerin, sorbitol, bisphenol A, 4,4'-dihydroxydiphenyl, 4,4'-dihydroxydiphenyl ether, and trimethylolpropane; and a chain extender (a2-2) having an amino group, such as ethylenediamine, 1,2-propanediamine, 1,6-hexamethylene diamine, piperazine, 2,5-dimethyl piperazine, isophorone diamine, 1,2-cyclohexanediamine, 1,3-cyclohexanediamine, 1,4-cyclohexanediamine, 4,4'-dicyclohexyl methanediamine, 3,3'-dimethyl-4,4'-dicyclohexyl methanediamine, 1,4-cyclohexanediamine, and hydrazine. These chain extenders may be used alone, or two or more types thereof may be used in combination.

From the viewpoint of easily adjusting the flow starting temperature of obtained the aqueous urethane resin (A), and obtaining further excellent adhesiveness and resistance to moist heat, the amount of the chain extender (a2) used is preferably 0.8% to 4.3% by mass, more preferably 1% to 3.5% by mass, and still more preferably 1.5% to 3.2% by mass, with respect to the total mass of the polyol (a1), a raw material used for producing the aqueous urethane resin having an hydrophilic group, and a chain extender (a2).

Examples of the polyisocyanate (a3) include aromatic polyisocyanate (a3-1) such as phenylene diisocyanate, toluene diisocyanate, diphenyl methane diisocyanate, xylylene diisocyanate, naphthalene diisocyanate, polymethylene polyphenyl polyisocyanate, and carbodiimidated diphenyl methane polyisocyanate; and aliphatic polyisocyanate and/or alicyclic polyisocyanate (a3-2) such as hexamethylene diisocyanate, lysine diisocyanate, cyclohexane diisocyanate, isophorone diisocyanate, dicyclohexyl methane diisocyanate, xylylene diisocyanate, tetramethyl xylylene diisocyanate, dimer acid diisocyanate, and norbornene diisocyanate. These polyisocyanates may be used alone, or two or more types thereof may be used in combination.

The amount of the polyisocyanate (a3) used is preferably 5% to 40% by mass, and more preferably 10% to 30% by mass with respect to the total mass of the raw materials of the aqueous urethane resin (A), from the viewpoints of production stability and the mechanical properties of the obtained coating film.

In a case of using an anionic urethane resin as the aqueous urethane resin (A), from the viewpoint of easily adjusting the flow starting temperature and the acid value, and obtaining further excellent adhesiveness and resistance to moist heat, it is preferable to use an anionic urethane resin (A-A-1) which is a reaction product of the polyol (a1), a glycol compound having a carboxyl group, a chain extender including a chain extender (a2-1) having a hydroxyl group, and aromatic polyisocyanate (a3-1), or an anionic urethane resin (A-A-2) which is a reaction product of the polyol (a1), a glycol compound having a carboxyl group, a chain extender including a chain extender (a3-2) having an amino group, and an aliphatic polyisocyanate and/or alicyclic polyisocyanate (a3-2). In a case of using the anionic urethane resin as the aqueous urethane resin (A), the acid value of the anionic urethane resin is preferably 3 to 7 mgKOH/g from the viewpoint of obtaining even better adhesiveness and resistance to moist heat.

In addition, in a case of using a nonionic urethane resin as the aqueous urethane resin (A), from the viewpoint of easily adjusting the flow starting temperature and the acid value, and obtaining further excellent adhesiveness and resistance to moist heat, it is preferable to use a nonionic urethane resin (A-N-1) which is a reaction product of the polyol (a1), a compound having oxyethylene structure, a chain extender containing a chain extender (a2-1) having a hydroxyl group, and aromatic polyisocyanate (a3-1), or a nonionic urethane resin (A-N-2) which is a reaction product of the polyol (a1), a compound having oxyethylene structure, a chain extender containing a chain extender (a3-2) having an amino group, and an aliphatic polyisocyanate and/or alicyclic polyisocyanate (a3-2).

Examples of the method of producing the aqueous urethane resin (A) include a method in which the polyol (a1), a raw material used for producing the aqueous urethane resin having a hydrophilic group, the chain extender (a2), and the polyisocyanate (a3) are charged all at once and allowed to react. These reactions are performed, for example, at a temperature of 50° C. to 100° C. for 3 to 10 hours.

In the production of the aqueous urethane resin (A), the molar ratio [isocyanate group/(hydroxyl group and amino group)] of the isocyanate group of the polyisocyanate (a4) to the sum of the hydroxyl group of the polyol (a1), the hydroxyl and amino groups of the raw material used for producing the aqueous urethane resin having a hydrophilic group, and the hydroxyl and amino groups of the chain extender (a3) is preferably 0.8 to 1.2, more preferably 0.9 to 1.1.

When the aqueous urethane resin (A) is produced, it is preferable to deactivate isocyanate groups remaining in the aqueous urethane resin (A). The isocyanate groups are preferably deactivated using an alcohol having one hydroxyl group, such as methanol. The amount of the alcohol used is preferably 0.001 to 10 parts by mass with respect to 100 parts by mass of aqueous urethane resin (A).

In the production of the aqueous urethane resin (A), an organic solvent may be used. Examples of the organic solvent include a ketone compound such as acetone and methyl ethyl ketone; an ether compound such as tetrahydrofuran and dioxane; an acetic ester compound such as ethyl acetate and butyl acetate; a nitrile compound such as acetonitrile; and an amide compound such as dimethyl formamide, N-methyl pyrrolidone. These organic solvents may be used alone, or two or more types thereof may be used in combination. Note that, the organic solvent is preferably removed by a distillation method or the like when obtaining an aqueous resin composition.

As the aqueous medium (B), for example, water, an organic solvent miscible with water, a mixture thereof, or the like can be used. Examples of the water-miscible organic solvent include an alcohol solvent such as methanol, ethanol, and n— and isopropanol; a ketone solvent such as acetone and methyl ethyl ketone; a polyalkylene glycol solvent such as ethylene glycol, diethylene glycol, and propylene glycol; an alkyl ether solvent of polyalkylene glycol; and a lactam solvent such as N-methyl-2-pyrrolidone. These aqueous mediums may be used alone, or two or more types thereof may be used in combination. Among them, from the viewpoint of safety and reduction of environmental burden, it is preferable to use only water or a mixture of water and an organic solvent miscible with water, and using only water is more preferable.

From the viewpoint of workability, the mass ratio [(A)/(B)] of the aqueous urethane resin (A) to the aqueous medium (B) is preferably 10/80 to 70/30, and is more preferably 20/80 to 60/40.

The one-component aqueous resin composition of the present invention contains the aqueous urethane resin (A) and the aqueous medium (B), and does not contain a crosslinking agent; however, it may contain additives other than the crosslinking agent. In the present invention, "one-component" means that it does not contain a crosslinking agent.

Examples of the crosslinking agent include a carbodiimide crosslinking agent, a polyisocyanate crosslinking agent, a melamine crosslinking agent, and an aziridine crosslinking agent.

Examples of the additives other than the crosslinking agent include an emulsifier, neutralizer, a thickening agent, a urethanation catalyst, a filler, a blowing agent, a pigment, a dye, an oil repellent, a hollow foam, a flame retardant, an antifoaming agent, a leveling agent, and anti-blocking agent. These additives may be used alone, or two or more types thereof may be used in combination.

As the emulsifier, for example, the same emulsifier as that used in obtaining the aqueous urethane resin which is forcibly dispersed in the aqueous medium (B) can be used. Those can be used alone or two or more types thereof may be used in combination. Among them, a nonionic emulsifier is preferably used from the viewpoint of further improving water dispersion stability and texture of the aqueous urethane resin (A).

From the viewpoint of the water dispersion stability and texture, the amount of the emulsifier to be used is preferably 0.1 to 30 parts by mass and is more preferably 1 to 10 parts by mass with respect to 100 parts by mass of the aqueous urethane resin (A).

The neutralizer neutralizes the carboxyl group of the aqueous urethane resin (A) and examples thereof includes a nonvolatile base such as sodium hydroxide and potassium hydroxide; and a tertiary amine compound such as trimethylamine, triethylamine, dimethyl ethanolamine, methyl diethanolamine, and triethanol. These neutralizers may be used alone, or two or more types thereof may be used in combination.

The amount used in a case where the neutralizer is used is preferably 0.8 to 1.2 times the number of moles of the carboxyl group contained in the aqueous urethane resin (A).

Next, a fiber laminate of the present invention will be described.

The fiber laminate includes a layer (iii) that is formed from the one-component aqueous resin composition, and a fiber base (iv).

Examples of the fiber base (iv) include a nonwoven fabric, a woven fabric, and a knitted material. Examples of the constituent of the fiber base include a polyester fiber, a nylon fiber, an acrylic fiber, an acetate fiber, a rayon fiber, and polylactic acid fiber; cotton, hemp, silk, wool, and blended fibers thereof.

As a method of producing the fiber laminate, it is preferable to use a dry lamination method. For example, a method of thermocompression bonding by applying the one-component aqueous resin composition to the release paper (i), then drying the paper, and attaching the fiber base (iv).

Examples of a method of applying the one-component aqueous resin composition include a method of using a roll coater, a knife coater, a comma coater, and an applicator. The thickness of the coating material after drying of the one-component aqueous resin composition is, for example, 5 to 100 μm.

As a method of drying the aqueous resin composition, for example, a method of drying at a temperature of 60° C. to 130° C. for 30 seconds to 10 minutes can be exemplified.

Subsequently, the dried product of the aqueous resin composition is preferable to be attached (laminated) to the fiber base material, and perform thermocompression bonding at a pressure of, for example, 5 to 10 MPa/m$^2$ by using a pressure roll or the like heated to 80° C. to 140° C. Thereafter, aging may be carried out at a temperature of 20° C. to 60° C., if necessary. By the above method, a fiber laminate having excellent adhesiveness and resistance to moist heat can be obtained.

As a method of producing synthetic leather using the aqueous resin composition, for example, a method of thermocompression bonding by applying the one-component aqueous resin composition to the skin layer (ii) formed on the release paper (i), then drying the paper, and attaching the fiber base (iv).

As the resin composition for forming the skin layer (ii), a known resin composition can be used, for example, an aqueous urethane resin composition, an aqueous acrylic resin composition, a solvent type urethane resin composition, and a solvent type acrylic resin composition can be exemplified. Among them, from the viewpoint of reducing the environmental burden, it is preferable to use an aqueous urethane resin composition and an aqueous acrylic resin composition.

As a method of forming the skin layer (ii), for example, a method of applying a resin composition for forming the skin layer (ii) to the release paper (i) and drying the same can be exemplified. Examples of a method of applying the resin composition include a method of using a roll coater, a knife coater, a comma coater, and an applicator. The thickness of the coating material after drying of the resin composition is, for example, 5 to 100 μm. Subsequently, a layer (iii) formed from the one-component aqueous resin composition and a fiber base (iv) are formed on the skin layer (ii), but the synthetic leather can be produced by the same method as described above.

The one-component aqueous resin composition of the present invention exhibits excellent adhesiveness and resistance to moist heat without the aid of a crosslinking agent. Further, since the crosslinking agent is not used, there is no need to consider pot life or aging. Accordingly, the one-component aqueous resin composition of the present invention can be suitably used for producing a coating agent of a glove, a leather-like sheet, a curtain, a sheet, and the like.

EXAMPLES

Hereinafter, the present invention will be described in more detail by way of examples.

[Example 1] Preparation of One-Component Aqueous Resin Composition (X-1)

In the presence of 3,036 parts by mass of methyl ethyl ketone and 0.1 parts by mass of stannous octylate, 1,000 parts by mass of polyether polyol ("PTMG2000" manufactured by Mitsubishi Chemical Corporation, with a number average molecular weight of 2,000) and 16 parts by mass of 2,2-dimethylolpropionic acid, 25 parts by mass of ethylene glycol, and 260 parts by mass of diphenylmethane diisocyanate were allowed to react at 70° C. until the solution viscosity reached 20,000 mPa·s, and then 3 parts by mass of methanol was added thereto to stop the reaction, so that a methyl ethyl ketone solution of an anionic urethane resin (A-1-1) was obtained. After the obtained urethane resin solution was mixed with 70 parts by mass of polyoxyethylene distyrenated phenyl ether (Hydrophile-Lipophile Balance (hereinafter, abbreviated as "HLB"); 14) and 12 parts by mass of triethylamine, 1,950 parts by mass of ion exchanged water was added thereto for phase inversion emulsification, so that an emulsion containing the anionic urethane resin (A-A-1-1) dispersed in water was obtained.

Subsequently, methyl ethyl ketone was removed from the emulsion by distillation, so that a one-component resin composition (X-1) having a nonvolatile content of 40% by mass was obtained. The anionic urethane resin (A-A-1-1) had a flow starting temperature of 100° C. and an acid value of 5.1 mgKOH/g.

Method of Measuring Flow Starting Temperature of Aqueous Urethane Resin (A)

The obtained one-component aqueous resin composition (X-1) was applied onto a release paper sheet (with a coating thickness of 150 μm), dried by a hot air dryer at 70° C. for 2 minutes, and then dried at 120° C. for 2 minutes to obtain a dried product. This dried product was measured for the flow starting temperature using a flow tester "CFT-500A" manufactured by Shimadzu Corporation (using a die having a diameter of 1 MM, a length of 1 MM, a load of 98 N, and a heating rate of 3° C./min).

Method of Measuring Acid Value of Aqueous Urethane Resin (A)

The obtained one-component aqueous resin composition (X-1) was dried, and then 0.05 g to 0.5 g of the dried and solidified resin particles were weighed in a 300 mL Erlenmeyer flask. Subsequently, an about 80 ml of a mixed solvent with a mass ratio of tetrahydrofuran to ion exchanged water [tetrahydrofuran/ion exchanged water] of 80/20 was added thereto to obtain a mixed solution.

Then, after a phenolphthalein indicator was mixed with the mixed solution, titration was carried out with a 0.1 mol/L aqueous potassium hydroxide solution, which had been previously standardized. Subsequently, the acid value (mgKOH/g) of the aqueous urethane resin (A) was determined from the amount of the aqueous potassium hydroxide solution used for the titration according to the following Expression (2).

$$A=(B\times f\times 5.611)/S \qquad (2)$$

In the expression, A represents the solid acid value (mgKOH/g) of the resin, B represents the amount (mL) of 0.1 mol/L of the aqueous potassium hydroxide solution used for the titration, f represents the factor of the 0.1 mol/L aqueous potassium hydroxide solution, S represents the mass (g) of the resin particles, and 5.611 is the formula weight of potassium hydroxide (56.11/10).

[Example 2] Preparation of One-Component Aqueous Resin Composition (X-2)

A one-component aqueous resin composition (X-2) containing an anionic urethane resin (A-A-1-2) was obtained using the same method as that used in Example 1, except that the polyether polyol was changed to polycarbonate polyol ("ETERNACOLL UH-200" manufactured by UBE INDUSTRIES, LTD., with a number average molecular weight of 2,000). The anionic urethane resin (A-A-1-2) had a flow starting temperature of 110° C. and an acid value of 5.1 mgKOH/g.

[Example 3] Preparation of One-Component Aqueous Resin Composition (X-3)

A one-component aqueous resin composition (X-3) containing an anionic urethane resin (A-A-1-3) was obtained using the same method as that used in Example 1, except that the polyether polyol was changed to polyester polyol ("PLACCEL 220" manufactured by Daicel Corporation, with a number average molecular weight of 2,000). The anionic urethane resin (A-A-1-3) had a flow starting temperature of 100° C. and an acid value of 5.1 mgKOH/g.

[Comparative Example 1] Preparation of One-Component Aqueous Resin Composition (X'-1)

In the presence of 3,505 parts by mass of methyl ethyl ketone and 0.1 parts by mass of stannous octylate, 1,000 parts by mass of polyether polyol ("PTMG2000" manufactured by Mitsubishi Chemical Corporation, with a number average molecular weight of 2,000), 52 parts by mass of 2,2-dimethylolpropionic acid, 8 parts by mass of ethylene glycol, and 260 parts by mass of diphenylmethane diisocyanate were allowed to react at 70° C. until the solution viscosity reached 20,000 mPa·s, and then 3 parts by mass of methanol was added thereto to stop the reaction, so that a methyl ethyl ketone solution of an anionic urethane resin (A'-1) was obtained. After the urethane resin solution was mixed with 38 parts by mass of trimethylamine, 1,800 parts by mass of ion exchanged water was added thereto for phase inversion emulsification, so that an emulsion containing the anionic urethane resin (A'-1) dispersed in water was obtained.

Subsequently, methyl ethyl ketone was removed from the emulsion by distillation, so that a one-component resin composition (X'-1) having a nonvolatile content of 40% by mass was obtained. The anionic urethane resin (A'-1) had a flow starting temperature of 100° C. and an acid value of 16.5 mgKOH/g.

[Comparative Example 2] Preparation of One-Component Aqueous Resin Composition (X'-2)

In the presence of 3,281 parts by mass of methyl ethyl ketone and 0.1 parts by mass of stannous octylate, 1,000 parts by mass of polyether polyol ("PTMG2000" manufactured by Mitsubishi Chemical Corporation, with a number average molecular weight of 2,000), 17 parts by mass of 2,2-dimethylolpropionic acid, 47 parts by mass of ethylene glycol, and 344 parts by mass of diphenylmethane diisocyanate were allowed to react at 70° C. until the solution viscosity reached 20,000 mPa·s, and then 3 parts by mass of methanol was added thereto to stop the reaction, so that a methyl ethyl ketone solution of an anionic urethane resin (A'-1) was obtained. After the urethane resin solution was mixed with 70 parts by mass of HLB and 13 parts by mass of triethylamine, 1,800 parts by mass of ion exchanged water was added thereto for phase inversion emulsification, so that an emulsion containing the anionic urethane resin (A'-2) dispersed in water was obtained.

Subsequently, methyl ethyl ketone was removed from the emulsion by distillation, so that a one-component resin composition (X'-2) having a nonvolatile content of 40% by mass was obtained. The anionic urethane resin (A'-2) had a flow starting temperature of 160° C. and an acid value of 5.1 mgKOH/g.

[Comparative Example 3] Preparation of One-Component Aqueous Resin Composition (X'-3)

In the presence of 2,749 parts by mass of methyl ethyl ketone and 0.1 parts by mass of stannous octylate, 1,000 parts by mass of polyether polyol ("PTMG2000" prepared by Mitsubishi Chemical Corporation, number average molecular weight of 2,000), 16 parts by mass of 2,2-dimethylolpropionic acid, and 162 parts by mass of diphenylmethane diisocyanate were allowed to react at 70° C. until the solution viscosity reached 20,000 mPa·s, and then 3 parts by mass of methanol was added thereto to stop the reaction, so that a methyl ethyl ketone solution of an anionic urethane resin (A'-3) was obtained. After the urethane resin solution was mixed with 59 parts by mass of HLB and 13 parts by mass of triethylamine, 1,800 parts by mass of ion exchanged water was added thereto for phase inversion emulsification, so that an emulsion containing the anionic urethane resin (A'-3) dispersed in water was obtained.

Subsequently, methyl ethyl ketone was removed from the emulsion by distillation, so that a one-component resin composition (X'-3) having a nonvolatile content of 40% by mass was obtained. The anionic urethane resin (A'-2) had a flow starting temperature of 40° C. or lower and an acid value of 5.6 mgKOH/g.

[Preparation Example 1] Preparation of Mixed Liquid for Skin Layer

In a mechanical mixer, 100 parts by mass of an ether-based urethane dispersion ("HYDRAN WLS-120AR" manufactured by DIC CORPORATION), 2 parts by mass of a thickener ("Borch Gel ALA" manufactured by Borcher), 0.2 parts by mass of a leveling agent ("TEGO Flow425" manufactured by Evonik), 0.2 parts by mass of an antifoaming agent ("TEGOTwin4000" manufactured by Evonik), and 5 parts by mass of a black pigment ("DILAC HS-9550" prepared by DIC CORPORATION) were stirred at 2,000 rpm for 2 minutes, and then, degassing was carried out using a vacuum degasser, so that a mixed liquid for a skin layer was obtained.

Method of Producing Synthetic Leather

In a mechanical mixer, 100 parts by mass of the one-component aqueous resin composition obtained in each of the examples and comparative examples, 2 parts by mass of a thickener ("Borch Gel ALA" manufactured by Borcher), 0.2 parts by mass of a leveling agent ("TEGO Flow425" manufactured by Evonik), and 0.2 parts by mass of an antifoaming agent ("TEGOTwin4000" manufactured by Evonik) were stirred at 2,000 rpm for 2 minutes, and then, degassing was carried out using a vacuum degasser, so that a mixed liquid was obtained.

The mixed liquid for a skin layer was applied onto a release paper sheet ("EK-100D" manufactured by Lintec Corporation) with a knife coater (with a coating thickness of 150 μm), then dried at 70° C. for 2 minutes using a hot air drier, and dried at 120° C. for 2 minutes to form a skin layer. The mixed liquid was further applied onto the skin layer using a knife coater (with a coating thickness of 150 μm), dried at 70° C. for 2 minutes using a hot air drier, and then dried at 120° C. for 2 minutes. Finally, a nonwoven fabric base material was placed on the dried product and then thermocompression-bonded with a hot roll press (at a roll temperature of 130° C., a press line pressure of 8 MPa/m$^2$, and a feed rate of 1 m/min), so that a synthetic leather was obtained.

Method of Evaluating Adhesiveness

The release paper sheet was peeled off from the synthetic leather, and a hot melt tape having a 2.5 cm width was placed thereon, and heated at 150° C. for 30 seconds for adhesion. The sample was cut along the width of the hot melt tape, and a part thereof was peeled off. The base material and the hot melt tape were gripped by a chuck, and the peel strength was measured using an autograph tester "AG-X plus" manufactured by Shimadzu Corporation. The average value of the data obtained by peeling off the test piece by 20 cm was calculated and then converted into a value per 1 cm width.

Method of Evaluating Resistance to Moist Heat

The synthetic leather was allowed to stand in an environment at 80° C. and a humidity of 95% for 5 weeks, and then the peel strength was measured using the same method. In this regard, when the skin layer dropped off during the humidity resistance test, the evaluation result was expressed by "—".

TABLE 1

|  | Example 1 | Example 2 | Example 3 | Comparative Example 1 | Comparative Example 2 | Comparative Example 3 |
|---|---|---|---|---|---|---|
| One-component aqueous resin composition | (X-1) | (X-2) | (X-3) | (X'-1) | (X'-2) | (X'-3) |
| Aqueous urethane resin (A) | (A-A-1-1) | (A-A-1-2) | (A-A-1-3) | (A'-1) | (A'-2) | (A'-3) |
| Flow starting temperature (° C.) | 100 | 110 | 100 | 100 | 160 | 40 or lower |
| Acid value (mgKOH/g) | 5.1 | 5.1 | 5.1 | 16.5 | 5.1 | 5.6 |
| Evaluation of adhesiveness (MPa) | 3.5 | 4 | 3.6 | 3.5 | 0.5 | 0.2 |
| Evaluation of moist heat resistance (MPa) | 2.5 | 2.7 | 2.2 | 1 | 0.2 | — |

It has been found that Examples 1 to 3 according to the present invention have excellent adhesiveness and resistance to moist heat.

On the other hand, Comparative Example 1, in which the aqueous urethane resin (A) used has an acid value higher than the range specified in the present invention, showed problems such as poor resistance to moist heat, dissolution of the adhesive layer during the moist heat test, and separation of the skin layer from the base material.

Comparative Example 2, in which the aqueous urethane resin (A) used has a flow starting temperature higher than the range specified in the present invention, showed problems such as failure to melt the adhesive layer in the thermocompression bonding step and a low initial peel strength.

Comparative Example 3, in which the aqueous urethane resin (A) used has a flow starting temperature lower than the range specified in the present invention, showed a problem in that the adhesive layer was in a melted stated even after the thermocompression bonding step so that the initial peel strength was low.

The invention claimed is:

1. A fiber laminate comprising:
a layer that is made from a one-component aqueous resin composition; and
a fiber base,
wherein the one-component aqueous resin composition comprising:
an aqueous urethane resin (A) that has a flow starting temperature of 50° C. to 155° C. and an acid value of 15 mgKOH/g or lower; and
an aqueous medium (B),
wherein the aqueous urethane resin (A) is an anionic urethane resin (A-A-1) which is a reaction product of a polyol (a1), a glycol compound having a carboxyl group, a chain extender including a chain extender (a2-1) having a hydroxyl group, and an aromatic polyisocyanate (a3-1), or
the aqueous urethane resin (A) is an anionic urethane resin (A-A-2) which is a reaction product of a polyol (a1), a glycol compound having a carboxyl group, a chain extender including a chain extender (a2-2) having an amino group, and an aliphatic polyisocyanate and/or alicyclic polyisocyanate (a3-2).

\* \* \* \* \*